Patented July 4, 1933

1,916,215

UNITED STATES PATENT OFFICE

IVAN GUBELMANN, HENRY J. WEILAND, AND OTTO STALLMANN, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

COMPOUND OF THE DIPHENYL-METHANE SERIES AND PROCESS OF PREPARING THE SAME

No Drawing.   Application filed July 2, 1928.   Serial No. 290,027.

This invention relates to amino benzyl ortho benzoic acids and to a process of preparing the same. It also relates to the nitrogen substitution products of the same, as for example, where the substituted groups are acidyls; acetyl, benzoyl, and phthaloyl, or derivatives of urea and the like. It includes in general those amino bodies which are prepared from benzoyl ortho benzoic acids by the steps of nitrating, reducing the nitro body to the amino group and then reducing the CO group to a $CH_2$ group. This invention does not include the 4'-amino-benzyl benzoic acid derivatives, as these are a subject of a copending application.

It is an object of this invention to provide a method whereby these products may be made technically available for use as such, since they are valuable products of themselves and more particularly so when used as the starting material for the preparation of dyestuffs.

Other and further important objects of this invention will become apparent from the following description and appended claims.

We have found that the amino benzyl ortho benzoic acids may be prepared by reducing the corresponding benzoyl ortho benzoic acids by methods adapted for reducing similar bodies, as for example, by the use of ammonia and zinc dust. The N-substituted derivatives may be prepared from the benzyl benzoic acids by known methods of preparing these derivatives from other aniline bodies. These N-substituted derivatives can also be prepared by first making the benzoyl benzoic acid derivative, then reducing this with ammonia and zinc to the benzyl derivative. The acidyl amino benzyl ortho benzoic acid can be hydrolyzed back to the amino benzyl ortho benzoic acid by known methods applicable to analogous compounds. The following equation expresses the most probable reaction taking place in reducing the amino benzoyl ortho benzoic acids to the amino benzyl ortho benzoic acids.

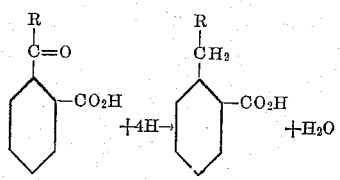

in which (R) represents a benzene nucleus with a hydrogen in the (2') or (3') position substituted with an amino group or a substituted amino group like acetyl amino, benzoyl amino, toluene-sulfonyl amido, phthaloyl-amido and the like. The hydrogen in the 4' position may be substituted by such groups as methyl, chloro, carboxy and the like.

Among the amino bodies which we have prepared are the following: 3'-amino-benzyl ortho benzoic acid, 3'-amino-4'-chloro-benzyl ortho benzoic acid, 3'-amino-4'-methyl benzyl ortho benzoic acid, 3'-amino-4'-carboxy-benzyl ortho benzoic acid, and a mixture of 2'-amino and 3'-amino-benzyl ortho benzoic acid as prepared by nitrating and reducing ortho benzoyl benzoic acid and then subsequently reducing the CO group to $CH_2$.

The amino benzyl benzoic acids contemplated by this invention are white to cream colored solids depending upon the purity of the product. They are in general soluble in dilute alkalies like caustic soda, sodium carbonate and ammonia. They are quite insoluble in water, but when acidified with dilute hydrochloric acid are more or less soluble in the form of their hydrochloric acid salts. They can in general be crystallized from benzene in the form of white crystals.

Without limiting our invention to any particular procedure, the following example, in which parts by weight are given, will serve to illustrate our method in its preferred form.

In 1500 parts of water and 1000 parts of concentrated ammonia are dissolved 275 parts of 3'-amino-4'-chloro-benzoyl ortho benzoic acid. A solution of 60 parts of copper sulfate crystals in 300 parts of water is then added. There are then added 500 parts of zinc dust and the mass is well agitated, the temperature of the solution being held at 70 to 80° C., for about 7 hours. The zinc residues are removed by filtration and to the filtrate is added sufficient sodium carbonate to completely decompose the ammonium salts. The ammonia is then distilled off. The residual solution is then filtered from further salt residues and precipitated by the use of acid until a maximum precipitation of 3'-amino-4'-chloro benzyl ortho benzoic acid occurs. After stirring cold for a while the product is filtered off. It can be recrystallized from benzene in the form of white crystals having a melting point of 132° C.

Other amino benzoyl ortho benzoic acids may be treated in a similar manner to give the corresponding amino benzyl ortho benzoic acids.

The acidyl derivatives or the urea derivatives may be made according to known methods of reacting upon an amine to form the corresponding acidyl or urea derivatives. As an example, for the preparation of the 3'-acetyl-amino-4'-chloro-benzoyl benzoic acid we give the following by way of illustration. The amino body is added to glacial acetic acid and to this solution is added some acetic anhydride and the mixture heated for a short time. After cooling and diluting with water, the acetyl derivative separates in the form of white crystals. Upon recrystallizing from acetic acid, the melting point of the purified product is 215 to 216° C.

Some of the acidyl amino derivatives of the benzyl ortho benzoic acids may be prepared from the corresponding acidyl amino benzoyl benzoic acids by treating the acidyl amino benzoyl benzoic acid in a similar manner as is done with the unsubstituted amino benzoyl benzoic acid. This is particularly the case with those N-substituted bodies which are not so easily hydrolyzed, as for example the phthaloyl amino bodies.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing a 3'-amino-benzyl-ortho-benzoic acid which is a member of the group consisting of primary 3'-amino-benzyl-ortho-benzoic acid and the N-substituted 3'-amino-benzyl-ortho-benzoic acids in which the N-substituent is an acidyl group or a urea radical, which comprises reducing the corresponding 3'-amino-benzoyl-ortho-benzoic acid.

2. The process of preparing a 3'-benzyl-ortho-benzoic acid which is a member of the group consisting of primary 3'-amino-benzyl-ortho-benzoic acid and the N-substituted 3'-amino-benzyl-ortho-benzoic acids in which the N-substituent is an acidyl group or a urea radical, which comprises reducing the corresponding 3'-amino-benzoyl-ortho-benzoic acid with zinc in an ammoniacal solution in the presence of copper sulfate.

3. A 3'-amino-benzyl-ortho-benzoic acid which is a member of the group consisting of primary 3'-amino-benzyl-ortho-benzoic acid and the N-substituted 3'-amino-benzyl-ortho-benzoic acids in which the N-substituent is an acidyl group or a urea radical.

4. 3'-amino benzyl ortho benzoic acids.

5. Amino-benzyl-ortho-benzoic acids in which the amino group is located in the benzene nucleus in a position other than para to the CH$_2$ group.

6. 3'-amino-benzyl-ortho-benzoic acids having most probably the following constitution:

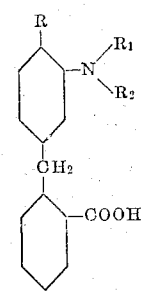

wherein R$_1$ and R$_2$ represent two hydrogen atoms, a hydrogen atom and an acidyl radical or a divalent acidyl radical and R represents a hydrogen atom, a chlorine atom or a carboxylic group.

7. 3'-amino-benzyl-ortho-benzoic acids which are members of the group consisting of primary 3'-amino-benzyl-ortho-benzoic acid and the N-substituted 3'-amino-benzyl-ortho-benzoic acids in which the N-substituent is an acidyl group or a urea radical.

8. 3'-amino-benzyl-ortho-benzoic acids substituted in the 4'-position by an alkyl, halogen, or carboxy group.

9. The process of producing a 3'-amino-benzyl-ortho-benzoic acid which is a member of the group consisting of primary 3'-amino-benzyl-ortho-benzoic acid and the N-substituted 3'-amino-benzyl-ortho-benzoic acids in which the N-substituent is an acidyl group or a urea radical, which comprises reducing the corresponding 3'-amino-benzoyl-ortho-benzoic acid with zinc in an ammoniacal solution in the presence of copper sulfate at a temperature of between 70 and 80° C.

In testimony whereof we have hereunto subscribed our names at Carrollville, Milwaukee County, Wis.

IVAN GUBELMANN.
HENRY J. WEILAND
OTTO STALLMANN.